Dec. 14, 1965  A. LORIO  3,223,834
ANTIGLARE LENS STRUCTURE ATTACHMENT FOR HEADLIGHTS
Filed Sept. 19, 1963

INVENTOR.
ANGELO LORIO
BY Kenwood Ross
ATTORNEY.

United States Patent Office 3,223,834
Patented Dec. 14, 1965

3,223,834
ANTIGLARE LENS STRUCTURE ATTACHMENT
FOR HEADLIGHTS
Angelo Lorio, 161 Bleecker St., Brooklyn, N.Y.
Filed Sept. 19, 1963, Ser. No. 309,980
1 Claim. (Cl. 240—46.57)

This invention relates to improvements in automobile head lights and is directed more particularly to an antiglare or fog lens attachment therefor, which is adapted to be detachably disposed over a headlight lens and for converting the headlight to a fog light.

More particularly, it is an object of the present invention to provide an attachment of extremely simple construction which may be conveniently carried in a motor vehicle and stored, as for example, in the glove compartment when not in use and which can be quickly and easily applied to the headlights of the vehicle for converting said headlights into fog lights for use in foggy or inclement weather when conventional headlights do not possess sufficient penetrating effect through a fog or other weather condition to afford the driver of the vehicle adequate visibility.

Another object of the invention is to provide a fog lens attachment which is so constructed that it can be quickly and easily applied to or removed from conventional headlights and which, when applied, will be positioned so that a colored lens portion thereof will completely overlie the conventional headlight lens.

Stated in another way, the invention comprehends the provision of an antiglare or fog lens for a head light which may be readily and easily applied thereto and removed therefrom. The device is constructed as a lens supplementary to that of the conventional headlight and is arranged to penetrate fog so as to facilitate driving for the operator.

One of the primary purposes of the invention is to provide structural and operational improvements in devices of the class to which reference has been made, which improvements not only simplify the structure as such, but also provide important distinct advantages in strength, durability and the like, and which improvements envision a construction of the above described character in which the number of operating parts is greatly reduced and which is compact in accordance with the demands and desires of manufacturers and purchasers alike and which is not only distinctive in its appearance and practical in its value but also reliable in its operation and efficient in its use.

A further object of the invention is to provide a simple and effective attachment which may be mounted and removed with ease and which nevertheless secures a perfect seat so as to allow an attachment seating the additional or fog lens in such manner on the headlight that the space between the two lenses is tightly sealed in a water and air tight manner.

An additional object of the invention consists in providing means for holding the fog lens in manner such that it is easily adjustable and adaptable to the headlights and to the specific arrangement and location of the same so that said means is capable of holding said fog lens tightly and firmly against the lens of the headlight.

As is known, a fog lens is a temporary expedient for emergency purposes and normally is advisedly removed or rendered inoperative when the emergency ceases.

Such emergency purposes arise when the normal white light is reflected by small water drops suspended in the air or by large drops falling through the air in sufficient density to such an extent that a back glare is produced, while illumination in front ceases. This condition may be improved by using monochromatic light of the shorter wave lengths, amber colored light being usually chosen. Such monochromatic amber colored light is, however, not suitable for normal use as it reduces the obtainable illumination very markedly. Therefore, this type of light is only usable in the above explained case.

Fog lens attachments best serve therefor when and if they are readily removable when and as the aforedescribed condition subsides.

The attachment of fog lenses on headlights heretofore has been connected with certain difficulties. The headlights are frequently mounted behind the fenders with merely the lens and lens mount projecting. Glass lenses can only be used if fixedly mounted and firmly held, but mounting is difficult to obtain on account of the spherical or curved shape of the headlight lenses. If mounted at a distance, water penetrates into the space between the lens, is evaporated by the heat of the beam and condenses on the fog lenses which is cooled by the cold air, thus reducing the illumination obtained very markedly.

According to this invention, the fog lens is attached to the headlight in such manner that the space between the fog lens and the headlight lens is tightly sealed, so that neither the outer fog carrying air nor water can penetrate into the said space. By the construction taught herein, the fog lens may be readily slipped into place and held securely without difficulty, at a distance from the headlight lens without the disadvantages associated with prior art arrangements.

My invention also consists in certain new and original features of construction and combination of parts hereinafter set forth and claimed in conjunction with the annexed drawing which illustrates a certain form of embodiment thereof, which form is deemed preferable and is a specific disclosure for the purpose of illustrating one embodiment of the invention by way of an example. It is to be understood that the various parts of which the invention consists can be variously changed within the scope of the appended claim without departing from the broad aspects and spirit hereof.

In the following description and claims, various details will be identified by specific names for convenience. These names, however, are intended to be as generic in their application as the art will permit.

Figure 1:
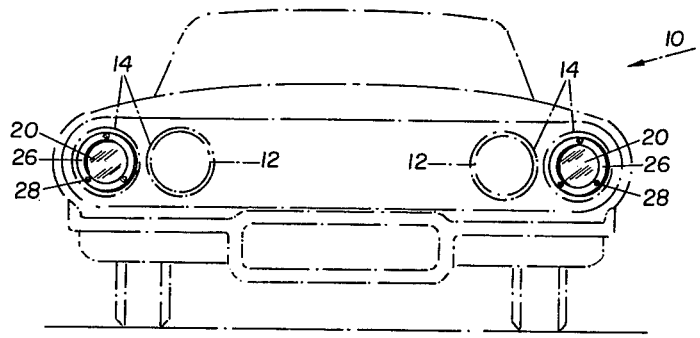
FIG. 1 is a front elevational view illustrating the preferred embodiment of the fog lens of the invention shown as associated with the head light of an automobile, the latter being shown in phantom.
Figure 2:
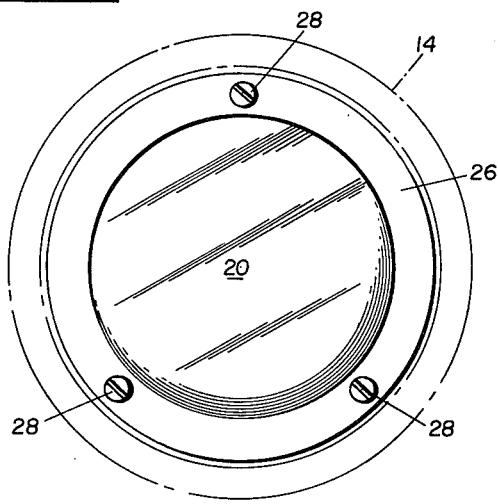
FIG. 2 is an enlarged front elevational view of the fog lens of the invention shown as associated with an automobile head light, the latter being shown in phantom.
Figure 3:
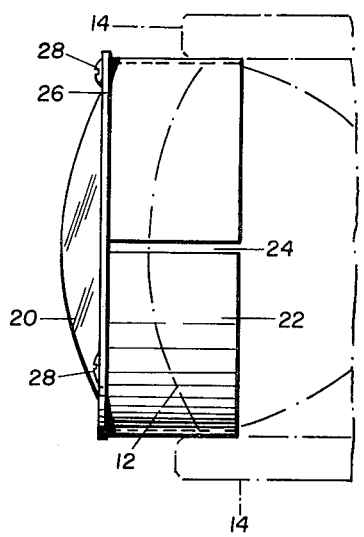
FIG. 3 is a side elevational view of the fog lens and headlight shown in FIG. 2.
Figure 4:
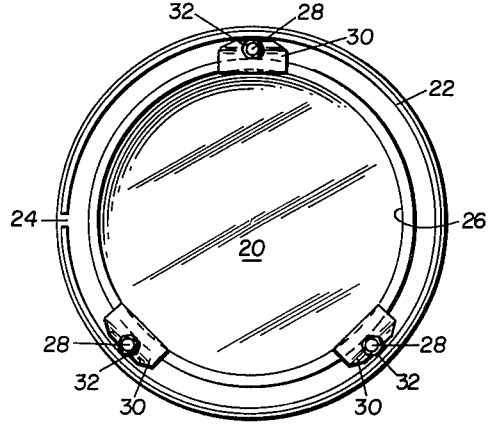
FIG. 4 is a rear elevational view of the fog lens of the invention.

Referring now specifically to the drawing more in detail wherein similar characters of reference indicate corresponding parts in the several figures and referring more particularly to the preferred form of my invention selected for illustrative purposes, I have shown, in FIG. 1, in phantom, the forward end of a motor vehicle 10 carrying pairs of headlights 12 normally referred to as twin headlights, at opposite sides of the grille thereof. Some are of usual construction and each comprises an annular housing or frame 14 in which the reflector and light source and lens are disposed in known manner to provide a unitary, removable, enclosed sealed beam type headlight, all as is known.

The attachment of the invention comprises a concavo-convex lens 20, formed substantially to the configuration of the outer side of the lens of the headlight and formed preferentially of a transparent or translucent material which is substantially unbreakable.

Further preferentially, the lens will be colored, such as amber or orange or yellow so as to transmit light rays from the normally white sealed-beam light. Certain shades of amber, orange and yellow have been found to be adapted to penetrate fog. That shade or color will be selected as will most efficiently penetrate fog.

Operationally, the lens 20 is adapted to fit over and to completely cover the headlight lens by a means now to be defined.

Means for holding the lens 20 relative to the housing 14 of the sealed-beam light 12 may include a cylindrical sleeve 22 extending rearwardly from said lens and being slideably receivable between said sealed beam light and said housing and being sleeved by the latter.

Sleeve 22 will be slit longitudinally as at 24 wherefore the lens may be readily adapted to fit the headlight of any type of vehicle as by a yielding of the portions of the sleeve at opposite sides of the slit.

Means for holding the lens 20 relative to sleeve 22 will include an annular ring 24 fixed to one end of sleeve 22 and adapted to overlie and embrace the peripheral rim of the outer face of lens 20.

Screws 28 extend rearwardly through ring 24 and through retaining clips 30 and are adapted to embrace the peripheral rim of the inner face of lens 20.

Preferentially, the retaining clips 30, formed from strips of resilient metal, will be disposed at a plurality of points, preferably at least two diametrically opposed points, and will be retained in situ by the screws 28 extendable therethrough with nuts 32 being threadedly engaged therewith in known manner.

The retaining clips 30 will be shaped for disposition in snug fitting manner relative to the peripheral edge of respective lens 20.

In the applying the lens 20, the free end of sleeve 22 is slipped between the sealed beam head light 12 and housing 14.

Lens 20 is held in place over the headlight lens by sleeve 22 so that light rays passing therethrough assume the color selected therefor.

To facilitate turning or rotating the lens 20 there may be manually engageable ribs, not shown, projecting outwardly therefrom adjacent peripheral edges thereof.

It will be readily apparent that only one embodiment of headlight has been illustrated and that the attachment may be equally well employed with other types of headlights, such as headlights having separable reflectors and lenses and headlights which are mounted in casings or housings separate from the vehicle grille or fenders. Likewise the fog lens attachment could be utilized with other types of illuminating means such as spotlights.

The invention may be embodied in other specific forms without departing from the essential characteristics thereof. Hence, the present embodiment is, therefore, to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What is desired to claim and secure by Letters Patent of the United States is:

A fog lens construction for overlying the lens of a head light having a frame therearound comprising, a sleeve, a fog lens releasably carried by said sleeve formed from colored transparent material having a contour to overlie said headlight lens, a ring-like rim integral with said sleeve and adapted to overlie and embrace the peripheral rim of the outer face of said lens, clips fixed to said rim and spaced around said sleeve and fog lens having resilient inner free ends extending inwardly over said fog lens, said sleeve having a perimeter receivable between said frame and headlight lens in tight sealing manner and provided with a slot extending the length thereto.

References Cited by the Examiner
UNITED STATES PATENTS

| | | | |
|---|---|---|---|
| 2,120,188 | 6/1938 | Reichard | 240—46.59 |
| 2,822,462 | 2/1958 | Price | 240—46.57 X |

FOREIGN PATENTS

| | | |
|---|---|---|
| 857,607 | 1/1961 | Great Britain. |

NORTON ANSHER, *Primary Examiner.*

C. R. RHODES, *Examiner.*